US012254726B2

(12) United States Patent
Lingala et al.

(10) Patent No.: US 12,254,726 B2
(45) Date of Patent: Mar. 18, 2025

(54) MONITORING ITEMS IN AN AREA ACCESSIBLE THROUGH AN ELECTRONIC LOCKING DEVICE

(71) Applicant: HONEYWELL INTERNATIONAL INC., Charlotte, NC (US)

(72) Inventors: Ramesh Lingala, Miyapur (IN); Ashis Kumar Sinha, Chandanagar (IN); Jeetendra Kumar Mallireddy, Serilingampally (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 197 days.

(21) Appl. No.: 17/831,777

(22) Filed: Jun. 3, 2022

(65) Prior Publication Data

US 2022/0392285 A1 Dec. 8, 2022

(30) Foreign Application Priority Data

Jun. 8, 2021 (IN) ............................. 202111025434

(51) Int. Cl.
*G07C 9/00* (2020.01)

(52) U.S. Cl.
CPC ..... *G07C 9/00309* (2013.01); *G07C 9/00944* (2013.01); *G07C 2009/00952* (2013.01)

(58) Field of Classification Search
CPC ............ G07C 9/00309; G07C 9/00944; G07C 2009/00952; G07C 9/27; G07C 9/28
USPC ........................................................ 340/5.7
See application file for complete search history.

(56) References Cited

U.S. PATENT DOCUMENTS 4,891,755 A 1/1990 Asher
6,215,396 B1 4/2001 Script
6,520,013 B1 2/2003 Wehrenberg
7,170,407 B2 1/2007 Wagner
(Continued)

FOREIGN PATENT DOCUMENTS

CN 107403531 A 11/2017
CN 107689126 A 2/2018
(Continued)

OTHER PUBLICATIONS

PYMNTS: Alexa Can Now Listen for Intruders, two pages. Posted on May 14, 2019. https://www.pymnts.com/amazon-innovations/2019/alexa-guard-echo-sp . . . .
(Continued)

*Primary Examiner* — Nam V Nguyen
(74) *Attorney, Agent, or Firm* — Seager, Tufte & Wickhem, LLP

(57) ABSTRACT

An illustrative example embodiment of a locking device includes a lock that selectively allows access to an area when the lock is unlocked. A processor is configured to control whether the lock is locked or unlocked. A transceiver is configured to communicate with a communication hub that is remote from the locking device. The processor is configured to cause the transceiver to provide an indication to the communication hub when the lock has been unlocked. The indication includes an instruction that the communication hub should begin monitoring a condition of at least one preselected item within the area.

24 Claims, 3 Drawing Sheets

(56) References Cited

U.S. PATENT DOCUMENTS

| | | | | |
|---|---|---|---|---|
| 8,331,544 | B2 * | 12/2012 | Kraus | H04L 12/2836 340/5.71 |
| 9,224,096 | B2 | 12/2015 | Oppenheimer | |
| 9,524,635 | B2 | 12/2016 | Fadell et al. | |
| 9,569,942 | B2 | 2/2017 | Richter et al. | |
| 10,026,246 | B2 * | 7/2018 | Friedli | E05F 15/76 |
| 10,062,233 | B1 * | 8/2018 | Rogers | G07C 9/38 |
| 10,074,249 | B1 | 9/2018 | Deeds | |
| 10,147,306 | B2 * | 12/2018 | Kinney | G08B 25/008 |
| 10,197,417 | B2 * | 2/2019 | Logan | D06F 39/00 |
| 10,258,131 | B2 | 4/2019 | Yim | |
| 10,382,608 | B2 * | 8/2019 | Gerhardt | H04W 12/50 |
| 10,457,421 | B2 * | 10/2019 | O'Toole | B60L 53/80 |
| 10,904,397 | B2 * | 1/2021 | Kerzner | H04M 11/025 |
| 11,151,816 | B2 * | 10/2021 | Schoenfelder | G07C 9/257 |
| 11,170,594 | B1 * | 11/2021 | Burge | G07C 9/00817 |
| 11,222,495 | B2 * | 1/2022 | Schoenfelder | G08B 25/001 |
| 11,295,162 | B2 * | 4/2022 | Rus | G06V 20/35 |
| 11,582,065 | B2 * | 2/2023 | Burd | H04L 67/025 |
| 2002/0180582 | A1 * | 12/2002 | Nielsen | G07C 9/21 340/5.6 |
| 2005/0030176 | A1 * | 2/2005 | Wagner | G08B 13/2462 340/8.1 |
| 2007/0289012 | A1 * | 12/2007 | Baird | H04L 9/321 726/19 |
| 2010/0302025 | A1 * | 12/2010 | Script | G08B 13/08 340/545.5 |
| 2012/0001755 | A1 | 1/2012 | Conrady | |

FOREIGN PATENT DOCUMENTS

| | | | |
|---|---|---|---|
| NL | 1010254 | C2 | 4/2000 |
| WO | 2016131756 | A1 | 8/2016 |

OTHER PUBLICATIONS

Rosebrock: Home surveillance and motion detection with the Raspberry Pi, Python, OpenCV, and Dropbox, 250 pages. https://pyimagesearch.com/2015/06/01/home-surveillance-and-motion-detection-with-the-raspberry-pi-pylon-and-opencv/.

Tapia: Portable Wireless Sensors for Object Usage Sensing in the Home: Challenges and Practicalities, 18 pages.

Tellers: Amazon Alexa Hacks for Real Estate Agents, dated Jul. 13, 2018, three pages. https://raspberrymills.com/blogs/news/amazon-alexa-hacks-for-real-estage-agents.

Tuohy: The Best Smart Home Sensors for Alexa, HomeKit, and SmartThings, updated Jan. 18, 2022, 21 pages. https://www.mytimes.com/wirecutter/reviews/best-smart-home-sensors-for-alexa/.

* cited by examiner

MONITORING ITEMS IN AN AREA ACCESSIBLE THROUGH AN ELECTRONIC LOCKING DEVICE

CROSS REFERENCE TO RELATED APPLICATIONS

This application claims priority to Indian Application No. 202111025434 filed on Jun. 8, 2021.

BACKGROUND

There are various situations in which an individual is allowed access to an area that contains items owned by someone else. For example, selling real estate typically includes allowing potential buyers and their agents to enter a building for a showing without the owner of the premises being present. During such a showing it is possible that the owner's personal property may be disturbed or taken. The risk of that happening is higher when a potential buyer is not accompanied by a real estate agent.

SUMMARY

An illustrative example embodiment of an electronic locking device includes a lock that selectively allows access to an area when the lock is unlocked. A processor is configured to control whether the lock is locked or unlocked. A transceiver is configured to communicate with a communication hub that is remote from the locking device. The processor is configured to cause the transceiver to provide an indication to the communication hub when the lock has been unlocked. The indication includes an instruction that the communication hub should begin monitoring a condition of at least one preselected item within the area.

An example embodiment having at least one of the features of the electronic device of the previous paragraph includes a housing that supports the lock, the processor and the transceiver, the housing being configured to be mounted on a door in a manner that the lock prevents the door from being opened when the lock is locked and allows the door to be opened when the lock is unlocked.

An example embodiment having at least one of the features of the electronic device of any of the previous paragraphs includes a housing that supports the lock, the processor and the transceiver, wherein the housing includes a receptacle that is configured to contain a key, the housing includes a cover that selectively allows access to the receptacle, the lock prevents access to the receptacle when the lock is locked, and the lock allows access to the receptacle when the lock is unlocked.

In an example embodiment having at least one of the features of the electronic device of any of the previous paragraphs, the processor is configured to interpret at least one communication that includes a request to unlock the lock, and the processor is configured to unlock the lock in response to a valid request to unlock the lock.

In an example embodiment having at least one of the features of the electronic device of any of the previous paragraphs, the transceiver is configured to receive at the least one communication that includes the request from a mobile station, and the processor is configured to at least temporarily store information regarding an identifier of the mobile station.

An illustrative example embodiment of a monitoring system includes the electronic locking device of any of the previous paragraphs, the communication hub, and at least one detector that is configured to be associated with the at least one preselected item in a manner that the at least one detector provides an indication of the condition of the at least one preselected item to the communication hub.

In an example embodiment having at least one of the features of the monitoring system of any of the previous paragraphs, the communication hub is configured to report a change in the condition of the at least one preselected item to at least one device remote from the communication hub, and the at least one device remote from the communication hub is a monitoring center or a mobile station.

In an example embodiment having at least one of the features of the monitoring system of any of the previous paragraphs, the at least one detector comprises a plurality of detectors, the at least one preselected item comprises a plurality of preselected items, and at least one of the detectors is associated with each of the preselected items.

In an example embodiment having at least one of the features of the monitoring system of any of the previous paragraphs, the at least one detector is configured to detect at least one of movement and adjustment of the at least one preselected item.

In an example embodiment having at least one of the features of the monitoring system of any of the previous paragraphs, the communication hub includes a speaker, the communication hub includes a second processor that is configured to determine when there is a change in the condition of the at least one preselected item based on the indication from the at least one detector, the second processor causes the speaker to emit an audible message regarding the change in the condition, and the audible message corresponds to at least one of an indication of the determined change in the condition or an instruction not to alter the condition of the at least one preselected item.

An illustrative example embodiment of a method includes determining that a lock of a locking device has been unlocked to gain entry to an area that includes at least one preselected item within the area; and communicating between the locking device and a communication hub that is remote from the locking device based on the lock being unlocked, wherein the communicating includes an indication that the lock has been unlocked and an instruction causing the communication hub to begin monitoring a condition of the at least one preselected item.

An example embodiment having at least one of the features of the method of the previous paragraph includes detecting the condition of the at least one preselected item using at least one detector associated with the at least one preselected item; and communicating the sensed condition from the at least one detector to the communication hub.

An example embodiment having at least one of the features of the method of any of the previous paragraphs includes reporting a change in the condition of the at least one preselected item from the communication hub to at least one device remote from the communication hub, wherein the at least one device remote from the communication hub is a monitoring center or a mobile station.

In an example embodiment having at least one of the features of the method of any of the previous paragraphs, the at least one detector comprises a plurality of detectors, the at least one preselected item comprises a plurality of preselected items, and the detecting and the communicating are performed for each of the preselected items.

In an example embodiment having at least one of the features of the method of any of the previous paragraphs, detecting the condition comprises detecting at least one of movement and adjustment of the at least one preselected item.

An example embodiment having at least one of the features of the method of any of the previous paragraphs includes determining when there is a change in the condition of the at least one preselected item based on an indication from the at least one detector, and causing a speaker of the communication hub to emit an audible message regarding the change in the condition, wherein the audible message corresponds to at least one of an indication of the determined change in the condition or an instruction not to alter the condition of the at least one preselected item.

An example embodiment having at least one of the features of the method of any of the previous paragraphs includes receiving at least one communication including a request to unlock the lock, and unlocking the lock in response to the request to unlock the lock being valid.

In an example embodiment having at least one of the features of the method of any of the previous paragraphs, the at least one communication is received from a mobile station and the method comprises at least temporarily storing information regarding an identifier of the mobile station.

In an example embodiment having at least one of the features of the method of any of the previous paragraphs, the locking device comprises a housing that supports the lock, the housing being configured to be mounted on a door in a manner that the lock prevents the door from being opened when the lock is locked and allows the door to be opened when the lock is unlocked.

In an example embodiment having at least one of the features of the method of any of the previous paragraphs, the locking device comprises a housing that supports the lock, the housing includes a receptacle that is configured to contain a key, the housing includes a cover that selectively allows access to the receptacle, the lock prevents access to the receptacle when the lock is locked, and the lock allows access to the receptacle when the lock is unlocked.

The various features and advantages of at least one disclosed example embodiment will become apparent to those skilled in the art from the following detailed description. The drawings that accompany the detailed description can be briefly described as follows.

DETAILED DESCRIPTION

Figure 1:
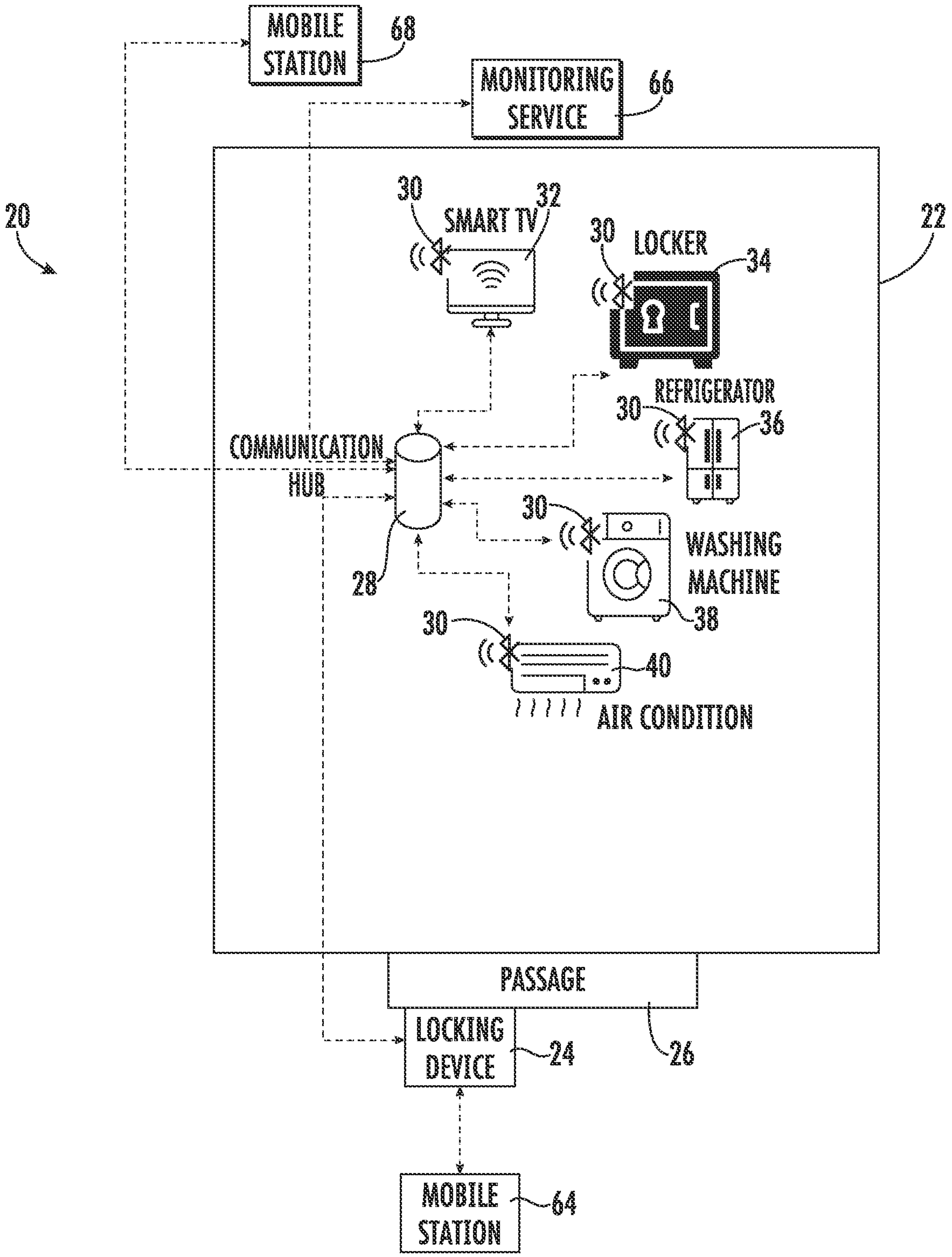
FIG. 1 schematically illustrates an example embodiment of a system for monitoring items.

FIG. 1 schematically illustrates an example embodiment of a system 20 for monitoring the content within an area 22. For discussion purposes, the area 22 will be considered a building, such as a personal residence. A locking device 24 controls access to a passage 26, such as a doorway, into the area 22.

A communication hub 28, which is situated within the area 22 in this example, is remote from the locking device 24 and configured to communicate with the locking device 24. The communication hub 28 is also configured to communicate with at least one detector 30 associated with at least one preselected item within the area 22. In the illustrated example, a plurality of detectors 30 are respectively associated with a plurality of items. For example, a smart TV 32, a safe 34, a refrigerator 36, a washing machine 38, and an air conditioner 40 each have at least one detector 30 associated with them. The detectors 30 detect a condition of the associated item and report the detected condition to the communication hub 28. If any detector 30 detects a condition change, the communication hub 28 communicates that to at least one remote device.

The type of detector 30 varies in different embodiments. For example, some detectors 30 are associated with a single item to monitor the condition or state of that item. Other detectors 30 are capable of monitoring multiple items. An example embodiment includes a camera supported on a mobile drone as at least one of the detectors 30. The drone is capable of moving about the area 22 so the camera can provide image or video information regarding multiple items within the area.

Some embodiments include at least one type of detector that provides an indication of the presence of at least one individual in the area 22 or a particular portion of the area 22. Such detectors include motion detectors and cameras, which work in a known manner to provide an indication that at least one individual is present or moving within an area of interest.

Figure 2:
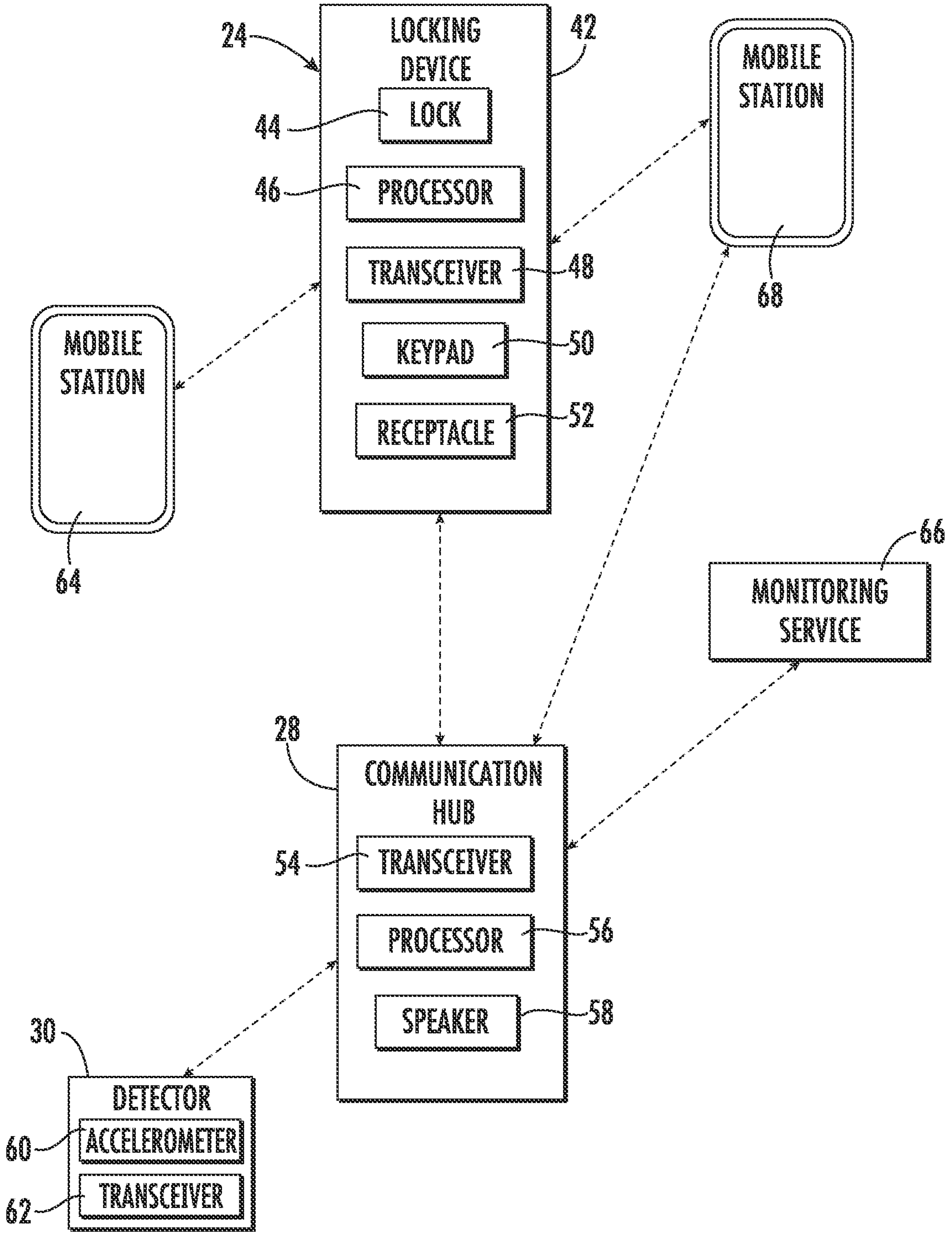
FIG. 2 schematically illustrates selected portions of the embodiment of FIG. 1 in more detail.

As schematically shown in FIG. 2, the locking device 24 includes a housing 42 that supports a lock 44, a processor 46 and a transceiver 48. In the example of FIG. 2, the locking device 24 also includes a key pad 50 and a receptacle 52. Some embodiments do not include a key pad or a receptacle.

In some example embodiments, the locking device 24 resembles a lock box that houses a physical key to provide access through the passage 26. For example, the receptacle 52 may be configured to hold the key that is useful for unlocking a door lock. The lock 44 in such an example controls access to the receptacle 52. In some embodiments, the key has a detector or RFID tag associated with it so that the position or status of the key may be monitored through the communication hub, for example.

In other embodiments, the locking device 24 is or is at least part of a door lock that is fixed to a door that provides access to the area 22. In such embodiments, the housing 44 need not include a receptacle 52 because a separate physical key would not be required by an individual desiring access to the area 22. Instead, the lock 44 is used for locking the door in such embodiments and unlocking the lock 44 allows the door to be opened.

The communication hub 28 in this example includes a transceiver 54, a processor 56 and a speaker 58. In some embodiments, the communication hub 28 is a virtual home assistant device.

Only one of the detectors 30 is schematically shown in FIG. 2 for discussion purposes. The example detector 30 includes an accelerometer 60 for detecting movement of the associated item and a transceiver 62.

The locking device 24 is configured to receive an access request, which may be entered through the keypad 50 or be communicated from a mobile station 64 and received by the transceiver 48. The processor 46 determines whether a received access request is valid. If the access request is valid, the processor 46 unlocks the lock 44.

The processor 46 causes the transceiver 48 to communicate an indication to the transceiver 54 of the communication hub 28 when the lock 44 is unlocked. The indication includes an instruction to the processor 56 to begin monitoring the conditions of the items 32-40 based on corresponding indications from the detectors 30. For example, if one of the items 32-40 were moved, the accelerometer 60 of the associated detector 30 would detect such movement. The transceiver 62 of the detector 30 provides an indication of that movement to the transceiver 54 of the communication hub 28. The processor 56 determines which item has been moved based on which of the detectors 30 reported the detected movement or condition change.

The communication hub 28 reports the detected condition change to at least one remote device. In the illustrated example arrangement, the communication hub 28 reports the condition change or movement of one of the items 32-40 to a monitoring service 66 that is located remotely from the residence or area 22. The monitoring service 66 may include a communication device, for example, managed by a security service provider or a real estate agency listing the residence 22 for sale.

The communication hub 28 in this example also communicates with a mobile station 68, which may belong to the owner of the residence 22 or a listing real estate agent. In some embodiments, the communication to the mobile station 68 provides an instantaneous alert regarding unauthorized movement of one of the items 32-40. This allows for a homeowner or real estate agent to quickly be aware of a situation within the area 22 and to take any action that may be needed.

The monitoring service 66 may relay reports of the detected condition change to a homeowner or listing real estate agent or may keep records regarding detected changes of monitored items and report them in response to an appropriate inquiry.

While movement of the items 32-40 is mentioned above, other characteristics of the condition of an item may be monitored. For example, one or more of the detectors 30 may be configured to detect when an item is turned on or otherwise manipulated. For example, the detector 30 associated with the air conditioning 40 may detect when the air conditioning is turned on or a temperature setting of the thermostat has been adjusted. The detector 30 associated with the safe 34 may detect when a keypad or dial of the safe has been manipulated indicating that someone may be attempting to gain access to the inside of the safe 34. A variety of other conditions may be monitored depending on the type of detectors 30 selected and depending on the items of interest. Those skilled in the art who have the benefit of this description will be able to select appropriate detectors with the capabilities that will meet the needs of their particular situation.

Figure 3:
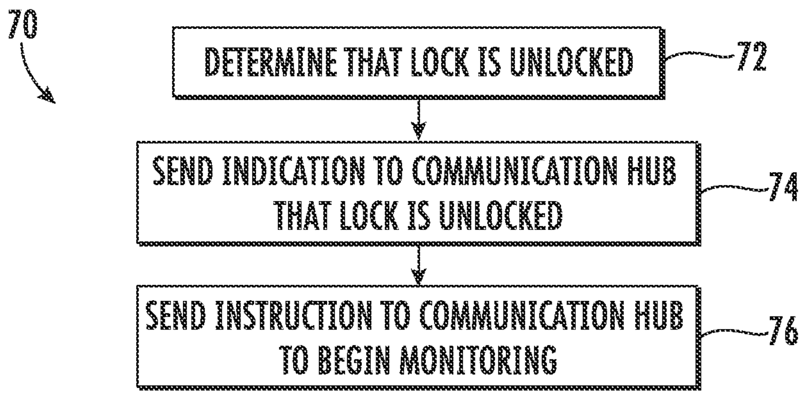
FIG. 3 is a flow chart diagram summarizing an example embodiment of a process performed by an example locking device.

FIG. 3 includes a flowchart diagram 70 that summarizes operation of the locking device 24 during a scenario in which an individual is attempting to gain access to the area 22. At 72, after a valid access request has been received, the processor 46 determines that the lock 44 has been unlocked. At 74, the processor 46 causes the transceiver 48 to send an indication to the communication hub 28 that the lock is unlocked. At 76, the locking device 24 sends an instruction to the communication hub 28 to begin monitoring. Although the indication that the lock is unlocked and the instruction to begin monitoring are shown separately schematically in FIG. 3, a single communication from the locking device 24 to the communication hub 28 may include both pieces of information.

Figure 4:
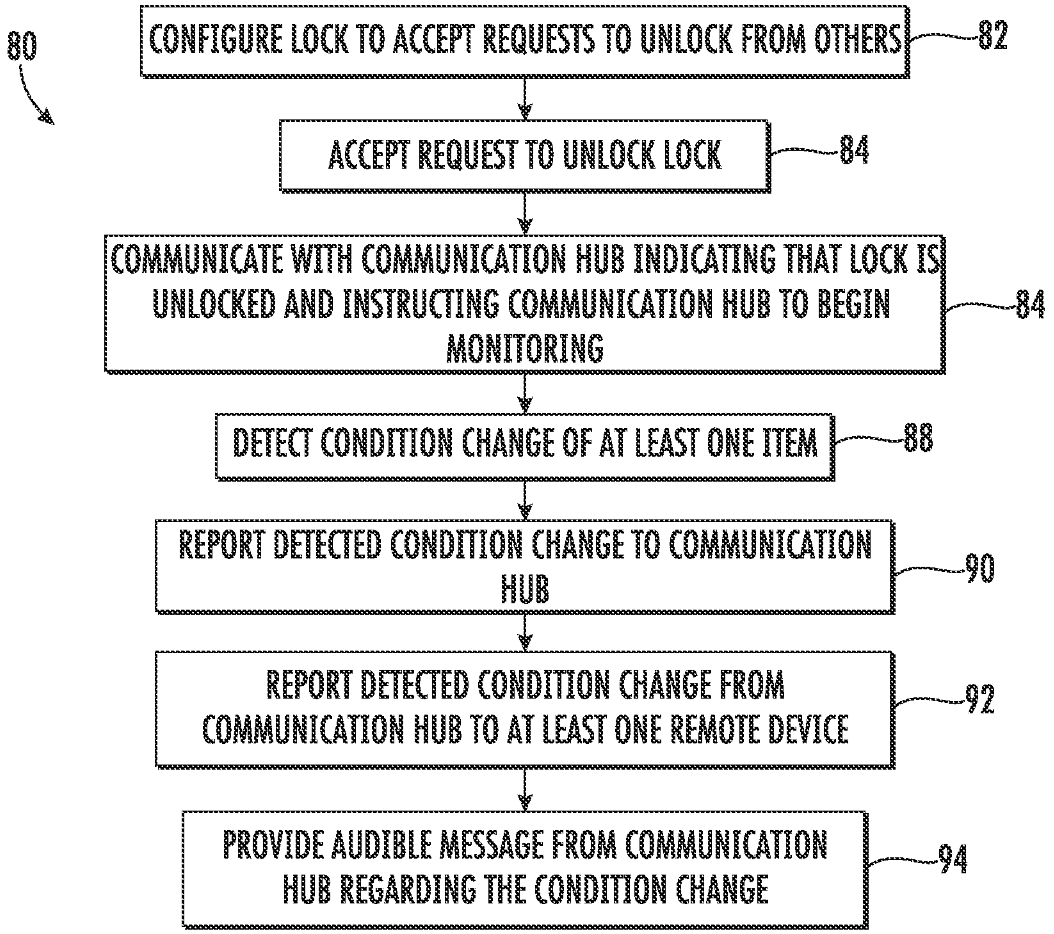
FIG. 4 is a flow chart diagram summarizing an example embodiment of a process of operating a system like that shown in FIG. 1.

FIG. 4 is a flowchart diagram 80 that summarizes an example use of the system schematically shown in FIGS. 1 and 2. At 82, the locking device 24 is configured to accept requests to unlock from individuals other than the owner or main user of the locking device 24. For example, the owner of the residence or area 22 may use the keypad 50 or the mobile station 68 to communicate with the processor 46 regarding acceptable access codes or conditions in which an access code should be acceptable. Once the locking device 24 has been configured to accept requests to unlock from others at 82, it is then possible for the locking device 24 to accept a request to unlock the lock 44 at 84. After the lock has been unlocked, the locking device 24 communicates with the communication hub 28 at 86 indicating that the lock 44 is unlocked and instructs the communication hub 28 to begin monitoring items within the area 22. At 88, at least one of the detectors 30 detects a condition change of the associated item 32-40. The detector 30 associated with the item that experienced a condition change reports the detected condition change to the communication hub 28 at 90. At 92, the communication hub 28 reports the detected condition change from the communication hub 28 to at least one remote device, such as the monitoring service 66, the mobile station 68, or both.

In the example of FIG. 4, the speaker 58 of the communication hub 28 is used to provide an audible message regarding the condition change at 94. For example, the processor 56 may be programmed or otherwise configured to cause the speaker 58 to emit an audible message such as "please do not move that." An audible message of that type alerts the individual within the area 22 that the conduct resulting in the detected change is undesired by the owner of the involved item. Such an audible message also serves to alert anyone with bad intentions, such as a desire to steal the item, that such activity is being monitored and reduces the risk of theft.

In an embodiment that includes a drone-supported camera detector 30, the drone may be activated in response to an indication that the locking device 24 has been unlocked. That indication may be received from the communication hub 28 or directly from the locking device 24. The drone is programmed to follow an individual that enters the area 22 after the locking device 24 has been unlocked until that individual leaves the area 22. The camera detector 30 supported on the drone provides information through images or video regarding any activity that involves any items in the area 22 or within a particular portion of the area 22.

For example, the detector 30 can be situated to provide an alert or other indication whenever an individual enters a space that is private or within which the owner of the premises desires to restrict access. The indication regarding at least one individual intruding into such a space or portion of the area 22 can be recorded for future reference or be used to instigate a warning or other communication that is provided to the owner of the premises.

The disclosed examples described above and other embodiments having similar features provide the ability to monitor the condition of selected items within an area that may be accessed under controlled conditions. Such monitoring capabilities allow for a homeowner or listing real estate agent, for example, to be made aware of any undesired or unauthorized movement, use or manipulation of items within a home during a real estate showing when the homeowner and listing agent are not present. This provides enhanced security over personal possessions in such circumstances. Of course, the disclosed example system and techniques are useful in scenarios other than real estate showings.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An electronic locking device, comprising:
a lock that selectively allows access to an area when the lock is unlocked;
a processor that is configured to control whether the lock is locked or unlocked; and
a transceiver that is configured to communicate with a communication hub that is remote from the lock, wherein:
the processor is configured to cause the transceiver to provide an indication to the communication hub when the lock has been unlocked;
the indication includes an instruction that the communication hub should begin monitoring a condition of at least one preselected item within the area, and wherein any change in a condition of the at least one preselected item is communicated to at least one remote device via the communication hub; and
the device includes at least one detector comprising a camera supported on a mobile drone, and wherein the mobile drone is activated in response to an indication that the lock been unlocked; and wherein an individual that enters the area after the lock has been unlocked is followed by the mobile drone until that individual leaves the area.

2. The electronic locking device of claim 1, comprising a housing that supports the lock, the processor and the transceiver, the housing being configured to be mounted on a door in a manner that the lock prevents the door from being opened when the lock is locked and allows the door to be opened when the lock is unlocked.

3. The electronic locking device of claim 1, comprising a housing that supports the lock, the processor and the transceiver, wherein
the housing includes a receptacle that is configured to contain a key,
the housing includes a cover that selectively allows access to the receptacle,
the lock prevents access to the receptacle when the lock is locked, and
the lock allows access to the receptacle when the lock is unlocked.

4. The electronic locking device of claim 1, wherein
the processor is configured to interpret at least one communication that includes a request to unlock the lock, and
the processor is configured to unlock the lock in response to a valid request to unlock the lock.

5. The electronic locking device of claim 4, wherein the transceiver is configured to receive at the least one communication that includes the request from a mobile station, and
the processor is configured to at least temporarily store information regarding an identifier of the mobile station.

6. The electronic locking device of claim 1, wherein the at least one preselected item comprises a plurality of preselected items that include a plurality of moveable items and a plurality of stationary items, and including a plurality of detectors that comprise a plurality of movement detectors associated with the plurality of moveable items and a plurality of operational detectors associated with the plurality of stationary items.

7. A monitoring system, comprising:
the electronic locking device of claim 1;
the communication hub; and
at least one detector that is configured to be associated with the at least one preselected item in a manner that the at least one detector provides an indication of the condition of the at least one preselected item to the communication hub.

8. The monitoring system of claim 7, wherein
the at least one remote device is remote from the communication hub, and
the at least one remote device is a monitoring center or a mobile station.

9. The monitoring system of claim 7, wherein
the at least one detector comprises a plurality of detectors,
the at least one preselected item comprises a plurality of preselected items, and
at least one of the plurality of detectors is associated with each of the plurality of preselected items.

10. The monitoring system of claim 7, comprising at least one detector that is configured to provide an indication when at least one individual is present in at least one preselected portion of the area.

11. The monitoring system of claim 7, wherein
the communication hub includes a speaker,
the communication hub includes a second processor that is configured to determine when there is a change in the condition of the at least one preselected item based on the indication from the at least one detector,
the second processor causes the speaker to emit an audible message regarding the change in the condition, and
the audible message corresponds to at least one of an indication of a determined change in the condition or an instruction not to alter the condition of the at least one preselected item.

12. A method, comprising:
determining that a lock of a locking device has been unlocked to gain entry to an area that includes at least one preselected item within the area;
communicating between the locking device and a communication hub that is remote from the locking device based on the lock being unlocked, wherein the communicating includes an indication that the lock has been unlocked and an instruction causing the communication hub to begin monitoring a condition of the at least one preselected item; and
communicating any change in a condition of the at least one preselected item to at least one remote device via the communication hub;
wherein the at least one preselected item comprises a plurality of preselected items that include a plurality of moveable items and a plurality of stationary items, and including a plurality of detectors that comprise a plurality of movement detectors associated with the plurality of moveable items and a plurality of operational detectors associated with the plurality of stationary items, and including:
mounting at least one movement detector to each moveable item for movement therewith;
monitoring all movement of an associated moveable item and immediately communicating any changes in movement to the at least one remote device during an unlocking event;

associating at least one operational detector with each stationary item; includes monitoring operational conditions of an associated stationary item and immediately communicating any changes in operational conditions to the at least one remote device during the unlocking event.

13. The method of claim 12, comprising detecting the condition of the at least one preselected item using at least one detect or associated with the at least one preselected item, and communicating a sensed condition from the at least one detector to the communication hub.

14. The method of claim 13, comprising reporting a change in the condition of the at least one preselected item from the communication hub to at least one device remote from the communication hub, wherein the at least one remote device is remote from the communication hub and is a monitoring center or a mobile station.

15. The method of claim 13, wherein the at least one detector comprises a plurality of detectors, the at least one preselected item comprises a plurality of preselected items, and the detecting and the communicating are performed for each of the preselected items.

16. The method of claim 13, wherein detecting the condition comprises detecting at least one of movement and adjustment of the at least one preselected item.

17. The method of claim 13, comprising determining when there is a change in the condition of the at least one preselected item based on an indication from the at least one detector, and causing a speaker of the communication hub to emit an audible message regarding the change in the condition, wherein the audible message corresponds to at least one of an indication of a determined change in the condition or an instruction not to alter the condition of the at least one preselected item.

18. The method of claim 12, comprising receiving at least one communication including a request to unlock the lock, and unlocking the lock in response to the request to unlock the lock being valid.

19. The method of claim 18, wherein the at least one communication is received from a mobile station and the method comprises at least temporarily storing information regarding an identifier of the mobile station.

20. The method of claim 12, wherein the locking device comprises a housing that supports the lock, the housing being configured to be mounted on a door in a manner that the lock prevents the door from being opened when the lock is locked and allows the door to be opened when the lock is unlocked.

21. The method of claim 12, comprising using at least one detector for providing an indication when at least one individual is present in at least one preselected portion of the area.

22. The method of claim 12, including at least one detector comprising a camera supported on a mobile drone;

activating the mobile drone in response to an indication that the locking device been unlocked; and following an individual that enters the area after the locking device has been unlocked until that individual leaves the area.

23. An electronic locking device, comprising:

a lock that selectively allows access to an area when the lock is unlocked;

a processor that is configured to control whether the lock is locked or unlocked; and a transceiver that is configured to communicate with a communication hub that is remote from the lock, wherein:

the processor is configured to cause the transceiver to provide an indication to the communication hub when the lock has been unlocked;

the indication includes an instruction that the communication hub should begin monitoring a condition of at least one preselected item within the area, and wherein any change in a condition of the at least one preselected item is communicated to at least one remote device via the communication hub;

the at least one preselected item comprises a plurality of preselected items that include a plurality of moveable items and a plurality of stationary items, and including a plurality of detectors that comprise a plurality of movement detectors associated with the plurality of moveable items and a plurality of operational detectors associated with the plurality of stationary items;

each moveable item includes at least one movement detector mounted for movement therewith and that monitors all movement of an associated moveable item and immediately communicates any changes in movement to the at least one remote device during an unlocking event; and each stationary item includes at least one operational detector that monitors operational conditions of an associated stationary item and immediately communicates any changes in operational conditions to the at least one remote device during the unlocking event.

24. The electronic locking device of claim 23, wherein each moveable detector includes at least one accelerometer.

* * * * *